United States Patent
Kamei et al.

(10) Patent No.: US 9,507,379 B2
(45) Date of Patent: Nov. 29, 2016

(54) DISPLAY DEVICE AND METHOD OF SWITCHING DISPLAY DIRECTION

(75) Inventors: Rinako Kamei, Osaka (JP); Norihiro Matsui, Osaka (JP); Takuya Matsumoto, Osaka (JP); Shohji Ohtsubo, Osaka (JP); Iku Ohama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 166 days.

(21) Appl. No.: 13/699,078

(22) PCT Filed: Feb. 21, 2012

(86) PCT No.: PCT/JP2012/001138
§ 371 (c)(1),
(2), (4) Date: Nov. 20, 2012

(87) PCT Pub. No.: WO2012/120799
PCT Pub. Date: Sep. 13, 2012

(65) Prior Publication Data
US 2013/0069988 A1 Mar. 21, 2013

(30) Foreign Application Priority Data
Mar. 4, 2011 (JP) ................................ 2011-047948

(51) Int. Cl.
G09G 5/00 (2006.01)
G06F 1/16 (2006.01)
H04M 1/725 (2006.01)

(52) U.S. Cl.
CPC ........ G06F 1/1637 (2013.01); H04M 1/72569 (2013.01); *G06F 2200/1614* (2013.01); *H04M 2250/12* (2013.01); *H04M 2250/52* (2013.01)

(58) Field of Classification Search
CPC ........... G06K 9/00248; G06K 9/3208; G06K 9/00281; G09G 2340/0492; G09G 5/34; H04W 52/0254; H04W 88/02; H04W 4/027; G06F 1/1637; G06F 2200/1614; H04M 1/72569; H04M 2250/52; H04M 2250/12

USPC .................................................. 345/156, 659
See application file for complete search history.

(56) References Cited

U.S. PATENT DOCUMENTS

2005/0104848 A1* 5/2005 Yamaguchi et al. .......... 345/156
2006/0265442 A1* 11/2006 Palayur ........................ 708/200
(Continued)

FOREIGN PATENT DOCUMENTS

CN         1860433 A     11/2006
CN      101465116 A      6/2009
(Continued)

OTHER PUBLICATIONS

Kimberly Tuck, "Embedded Orientation Detection Using the MMA8450Q", published in Sep. 2010. pp. 3-7.*
(Continued)

*Primary Examiner* — Xiao Wu
*Assistant Examiner* — Chong Wu
(74) *Attorney, Agent, or Firm* — Wenderoth, Lind & Ponack, L.L.P.

(57) ABSTRACT

A portable display device comprises: a tilt detection unit detecting an angle of rotation, measured between a vertical plane component of a tilt vector of a predetermined reference line in the display and a gravitational vector, as a display tilt; a facial orientation specification unit recognizing a face of a person facing the display and specifying an upright orientation of the face; a terminal orientation determination unit establishing a plurality of angle ranges, and determining whether the display tilt newly detected by the tilt detection unit exceeds a given angle range and enters another angle range, the given angle range including the angle detected by the tilt detection unit upon updating a previous display orientation; and a control unit causing the facial orientation specification unit to begin the specification when the terminal orientation determination unit makes an affirmative determination, and updating the display orientation according to the specified upright orientation.

13 Claims, 5 Drawing Sheets

(56) References Cited

U.S. PATENT DOCUMENTS

| | | | |
|---|---|---|---|
| 2010/0125816 A1* | 5/2010 | Bezos | 715/863 |
| 2010/0171693 A1 | 7/2010 | Tamura et al. | |
| 2011/0032220 A1 | 2/2011 | Shih et al. | |
| 2011/0193985 A1* | 8/2011 | Inoue | H04N 5/23216 348/222.1 |
| 2012/0029389 A1* | 2/2012 | Amiot et al. | 600/595 |
| 2012/0057064 A1* | 3/2012 | Gardiner et al. | 348/333.12 |

FOREIGN PATENT DOCUMENTS

| | | |
|---|---|---|
| CN | 101783133 A | 7/2010 |
| JP | 2005-100084 | 4/2005 |
| JP | 2008-131616 | 6/2008 |
| JP | 2009-130816 | 6/2009 |
| JP | 2011-34029 | 2/2011 |
| JP | 2011-138449 | 7/2011 |
| JP | 2011-203860 | 10/2011 |
| JP | 2011-221094 | 11/2011 |
| WO | 2011/104837 | 9/2011 |

OTHER PUBLICATIONS

International Search Report issued May 22, 2012 in corresponding International Application No. PCT/JP2012/001138.

Chinese Office Action issued Nov. 15, 2014, in Chinese Application No. 201280001501.0 (with partial English translation).

* cited by examiner

FIG. 2A
FIG. 2B
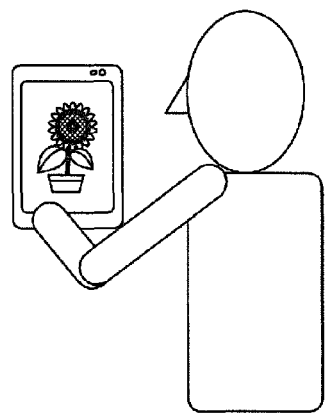
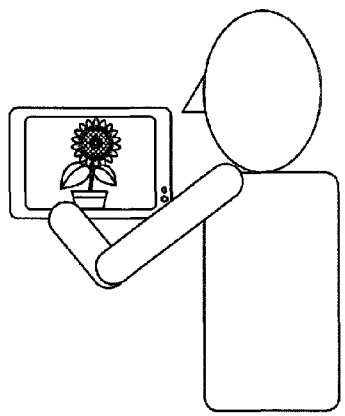
FIG. 2C
FIG. 2D
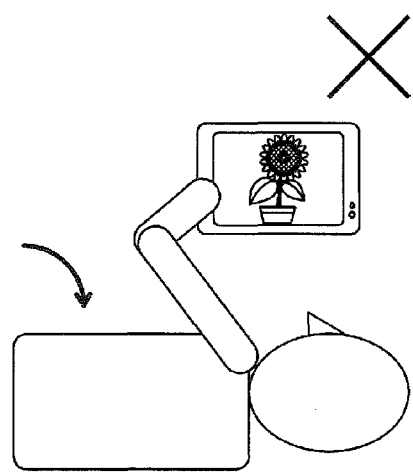
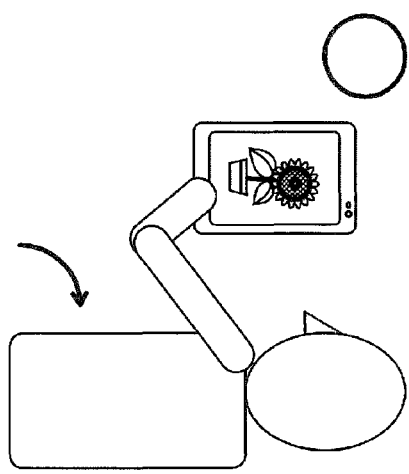

DISPLAY DEVICE AND METHOD OF SWITCHING DISPLAY DIRECTION

TECHNICAL FIELD

The present disclosure pertains to a display device that changes a display orientation of a display object displayed thereon, and in particular to an improvement user interface therefor.

BACKGROUND OF INVENTION

Background Art

Conventionally, a display device such as a smartphone or tablet terminal is able to detect a change in tilt with respect to the force of gravity using an acceleration sensor or the like, and to display a display object in accordance with the current vertical orientation (e.g., Patent Literature 1). Further, Patent Literature 2 describes a display device that captures a facial image of a user and recognizes the vertical orientation of the facial image in order to adjust the orientation of the display object to match that of the user's face.

CITATION LIST

Patent Literature

[Patent Literature 1]
Japanese Patent Application Publication No. 2008-131616
[Patent Literature 2]
Japanese Patent Application Publication No. 2009-130816

SUMMARY OF INVENTION

However, the display device described in Patent Literature 1 changes the vertical orientation of the display object to match the display orientation of the display device only when the orientation of the display device is changed. This is a potential problem for the user in that when the vertical orientations of the user's face and the display device do not match, such as situations when the user uses the display device while lying down. Also, the display device described in Patent Literature 2 changes the display such that there is a match between the vertical orientations of the user's face and the display object. However, this is problematic in that image capture and face recognition processes are performed continuously and consume a large amount of electric power, thus reducing the effective operation time of the battery.

In consideration of these problems the present disclosure aims to provide a display device capable of displaying the display object with an orientation that matches the orientation of the user's face while reducing electric power consumption.

In order to solve the aforementioned problem, the present disclosure provides a portable display device having a display, operable to switch a display orientation of a display object on the display among a plurality of available display orientations, the display device comprising: a tilt detection unit detecting an angle of rotation as being a display tilt, the angle being measured between a vertical plane component of a tilt vector of a predetermined reference line in the display and a gravitational vector; a facial orientation specification unit recognizing a face of a person facing the display and specifying an upright orientation of the face relative to a current position of the display; a terminal orientation determination unit establishing a plurality of angle ranges within each of which the display orientation remains unchanged depending on the available display orientations, and determining whether or not the display tilt newly detected by the tilt detection unit exceeds a given angle range and enters another angle range among the established angle ranges, the given angle range including the angle detected by the tilt detection unit upon updating a previous display orientation; and a control unit causing the facial orientation specification unit to begin the specification when the terminal orientation determination unit makes an affirmative determination, and updating the display orientation according to the upright orientation of the face specified for display.

According to the above-described configuration, the display device of the present disclosure is able to provide a display orientation that matches the vertical orientation of a user's face, while constraining electric power consumption.

BRIEF DESCRIPTION OF DRAWINGS

FIGS. 2A through 2D illustrate the operation of the display device 100.

FIGS. 4A and 4B-1 through 4B-4 illustrate a face recognition process.

DETAILED DESCRIPTION OF INVENTION

Embodiment

A display device 100 is described below as an Embodiment of the present disclosure.

(Outline)

Figure 1:
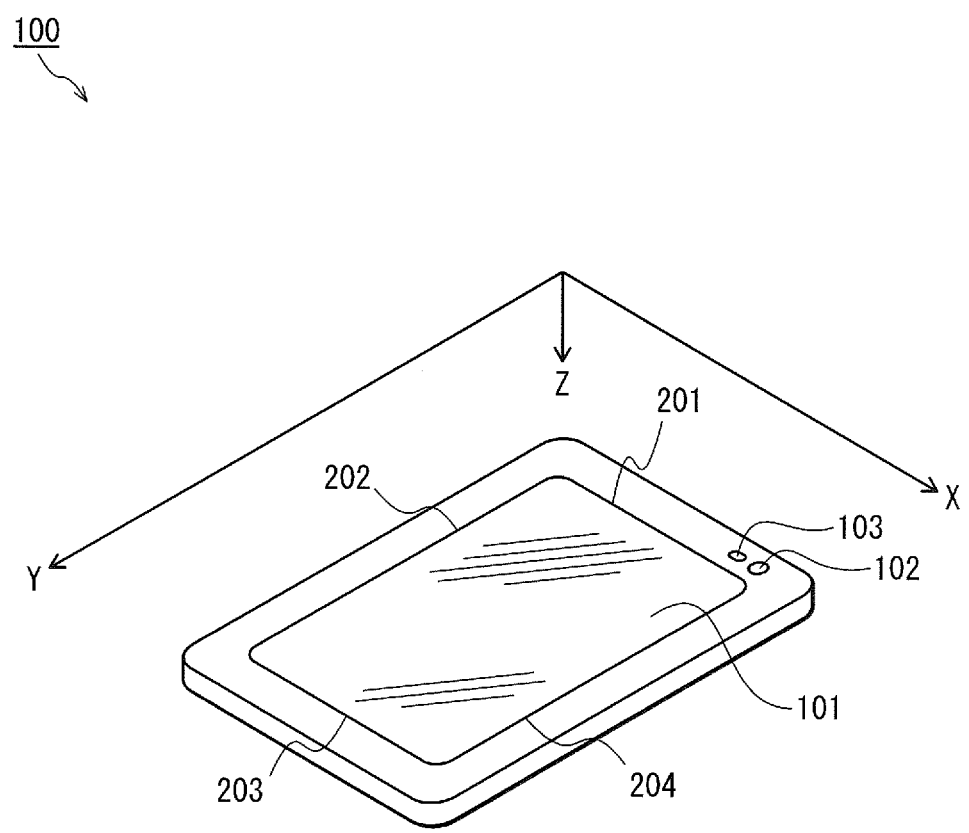
FIG. 1 is a perspective view of a display device 100 pertaining to the Embodiment.

FIG. 1 is a perspective view of the display device 100.

As shown, the display device 100 includes a touch panel 101, a camera 102, and a speaker 103. A user is able to view a display object displayed on the touch panel 101 and to listen to audio from the speaker 103. The display object may be composed of icons, text, images, and all other configurations of items displayed on the touch panel 101.

The touch panel 101 has four edges 201, 202, 203, and 204. The display object is displayed with an orientation that is one of A-facing, B-facing, C-facing, and D-facing. A-facing is an orientation where edge 201 is the top edge and edge 203 is the bottom edge, B-facing is an orientation where edge 202 is the top edge and edge 204 is the bottom edge, C-facing is an orientation where edge 203 is the top edge and edge 201 is the bottom edge, and D-facing is an orientation where edge 204 is the top edge and edge 202 is the bottom edge.

The camera 102 is provided in the same plane as a display surface of the touch panel 101 and is able to capture a facial image of the user using the display device 100.

FIGS. 2A through 2D illustrate the operation of the display device 100.

As shown, when the user using the display device 100 goes from a seated position (see FIG. 2A) to a lying position (see FIGS. 2C and 2D), the upright axis of the display device 100 changes from an orientation where edge 201 is vertically upward to an orientation where edge 202 is vertically upward. In such situations, displaying a B-facing display object (see FIG. 2C) to match the upright axis of the display device 100 is incorrect. The orientation of the display object is instead to be determined with respect to the orientation of the user's face. Specifically, the camera 102 captures a facial image of the user, specifies the upright orientation of the face based on the captured image, and matches the relative upright orientations of the face and the display object for display. That is, in such a situation, the touch panel 101 displays an A-facing display object as shown in FIG. 2D. The processes of capturing a facial image of the user and determining the upright orientation consume a large amount of electric power. Thus, these processes are performed only when the display device 100 has undergone a change in tilt equal to or exceeding a predetermined value.

Accordingly, the number of instances of power-consuming facial recognition process iterations is constrained, and the user is able to view the display object being displayed in accordance with the user's facial orientation, regardless of whether or not the user is using the display device 100 while lying down or otherwise positioned such that the vertical upward orientation of the display device 100 and the facial orientation of the user do not match.

(Configuration)

The following describes the display device 100 configuration.

Figure 3:
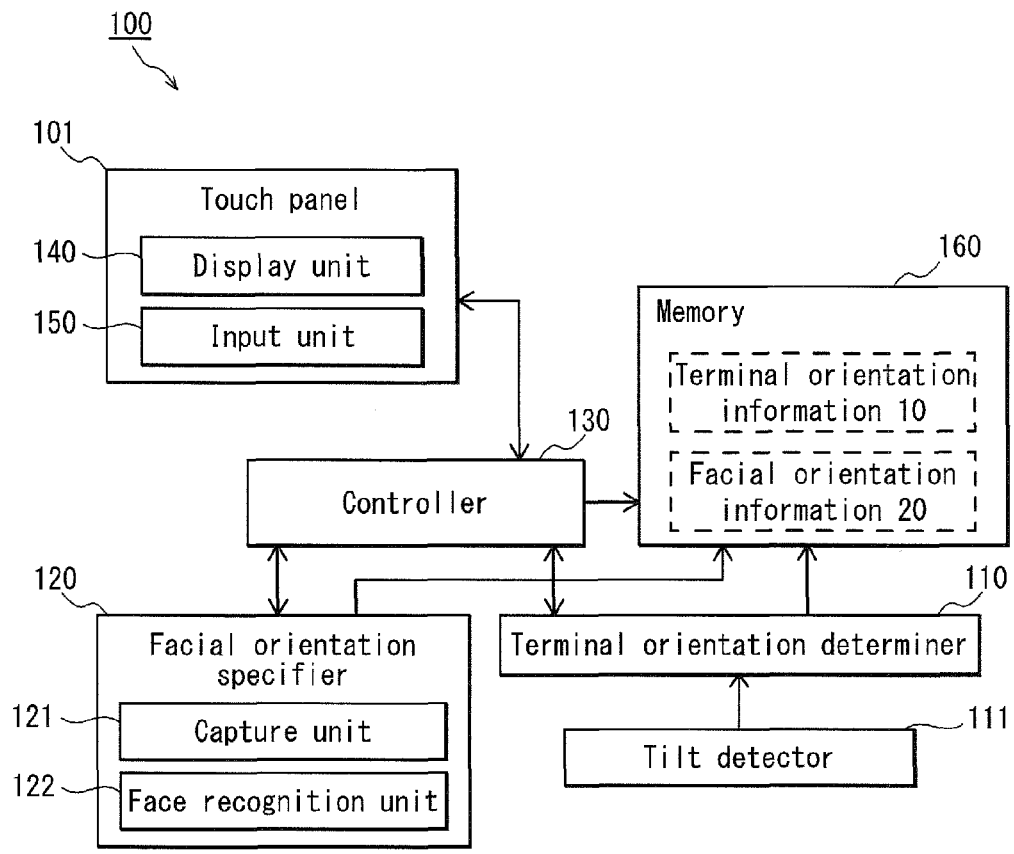
FIG. 3 is a functional configuration diagram of the display device 100.

FIG. 3 is a functional configuration diagram of the display device 100.

As shown, the display device 100 includes a terminal orientation determiner 110, a tilt detector 111, a facial orientation specifier 120, a controller 130, a display unit 140, an input unit 150, and a memory 160. The display device 100 includes a processor and memory, and thus realizes the functions of the terminal orientation determiner 110, the facial orientation specifier 120, the controller 130, the display unit 140, and the input unit 150 by having the processor execute a program stored in memory.

The tilt detector 111 is an acceleration sensor provided at the upper left of the display device 100, measuring acceleration with respect to three orthogonal axes. The three axes are as given in FIG. 1, where the x-axis extends to the bottom right, the y-axis extends to the bottom, and the z-axis extends vertically down from the top left of the touch panel 101 display face.

The terminal orientation determiner 110 determines whether or not a tilt currently detected by the tilt detector 111 has changed by a predetermined value or more since an update of the current display orientation for the display object. The tilt is defined as the angle between the x-y component of the pull of gravity on the touch panel 101 (also termed a gravitational vector) and the y-axis (also termed a reference line). The tilt also signifies the tilt of the touch panel 101 itself. In the present disclosure, the touch panel 101 and the display device 100 are indivisible. As such, the following description refers to the tilt of the display device 100 for convenience. Four angle ranges are defined to correspond to the A-facing, B-facing, C-facing, and D-facing orientations, namely a range of 315° to 45°, a range of 45° to 135°, a range of 135° to 225°, and a range of 225° to 315°, respectively. When the current orientation is estimated to have become difficult to view while the user's posture is assumed to remain unchanged, the terminal orientation determiner 110 beneficially makes an affirmative determination (i.e., a determination that the tilt of the current display object has changed the predetermined value or more since the update) to the effect that the tilt detected by the tilt detector 111 has changed from one angle range to another. Also, once the terminal orientation determiner 110 has made the affirmative determination, the later-described facial orientation specifier 120 performs a facial orientation specification process that is high in energy consumption. As such, the affirmative determination is beneficially not performed frequently, despite an unstable tilt approaching the limit of an angle range due to slight movements. The predetermined value is set to 70°, the midpoint of the angle range that includes the tilt detected by the tilt detector 111 upon updating the previous display object orientation is taken as a reference value for the tilt prior to changing, and the terminal orientation determiner 110 makes the affirmative determination when the change is of 70° or more from the reference value.

The facial orientation specifier 120 includes a capture unit 121 and a face recognition unit 122 further specifies the upright facial orientation of the user using the display device 100.

The capture unit 121 includes the camera 102 and operates the camera 102 by supplying electric power thereto in order to capture a facial image of the user. The capture unit 121 captures the facial image of the user for facial recognition purposes only when the terminal orientation determiner 110 determines that the tilt has changed by the predetermined value or more.

The face recognition unit 122 recognizes the eyes and nose in the facial image of the user captured by the capture unit 121 with reference to a face recognition template stored in advance. The vertical axis of the template matches the vertical axis of the face in the template. Elements of the face cannot be recognized when the vertical axis of the face in the image captured by the capture unit 121 greatly differs from the vertical axis of the template. Therefore, the face recognition unit 122 rotates the template orientation to be one of A-facing, B-facing, C-facing, and D-facing when performing the face recognition. The vertical axis of the captured image corresponds to the A-facing orientation of the touch panel 101.

The facial orientation specifier 120 specifies the upright orientation of the face according to the orientation of the template when the face recognition unit 122 recognizes the nose and eyes. For example, when the face recognition unit 122 recognizes the nose and eyes while the template orientation is A-facing, the facial orientation of the user is specified as being A-facing. The facial orientation specifier 120 notifies the controller 130 of the specified orientation. When the face recognition unit 122 fails to recognize the eyes and nose, the facial orientation specifier 120 notifies the controller 130 to such effect.

The controller 130 controls all operations pertaining to display by the display device 100.

Specifically, the controller 130 rotates the display object such that the vertical axis of the display object matches the vertical axis specified by the facial orientation specifier 120, and sends instructions to the display unit 140 so as to shrink or magnify the display objects on the touch panel 101 to an appropriate size. When the facial orientation specifier 120 fails to specify the upright facial orientation, the controller 130 also controls the display in response to the tilt detected by the tilt detector 111.

The display unit 140 includes the touch panel 101, receives instructions from the controller 130, and displays the display object on the touch panel 101. The input unit 150 detects contact made on the touch panel 101 and receives input from the user.

The memory 160 is an area storing later-described terminal orientation information 10 and facial orientation information 20.

(Data)

The terminal orientation information 10 is described first.

The terminal orientation information 10 is information indicating a midpoint of the angle range that includes the tilt detected by the tilt detector 111, and is stored as one of 0°, 90°, 180°, and 270°. The terminal orientation information 10 is updated by the controller 130 once the terminal orientation determiner 110 makes the affirmative determination. Specifically, the value of the terminal orientation information 10 is updated according to the tilt detected by the tilt detector 111 to be 0° for an angle of 315° to 45°, 90° for an angle of 45° to 135°, 180° for an angle of 135° to 225°, and 270° for an angle of 225° to 315°.

The determination process by the terminal orientation determiner 110 uses a pre-change tilt as the reference value, takes a tilt value detected by the tilt detector 111 for the previous display object orientation update as n, and takes the terminal orientation information 10 as f(n), expressed as follows.

$$f(n) = 0 (0 \leq n < 45, 315 \leq n < 360) \quad \text{(Math. 1)}$$
$$= 90 (45 \leq n < 135)$$
$$= 180 (135 \leq n < 225)$$
$$= 270 (225 \leq n < 315)$$

The facial orientation information 20 is described next.

The facial orientation information 20 is information indicating the current display orientation of the display object, and is stored as one of A-facing, B-facing, C-facing, and D-facing. The facial orientation information 20 is updated by the controller 130 after the display is updated through the facial orientation specification process, to reflect the display orientation at the current time.

(Operations)

The following describes the operations of the display device 100.

Figure 5:
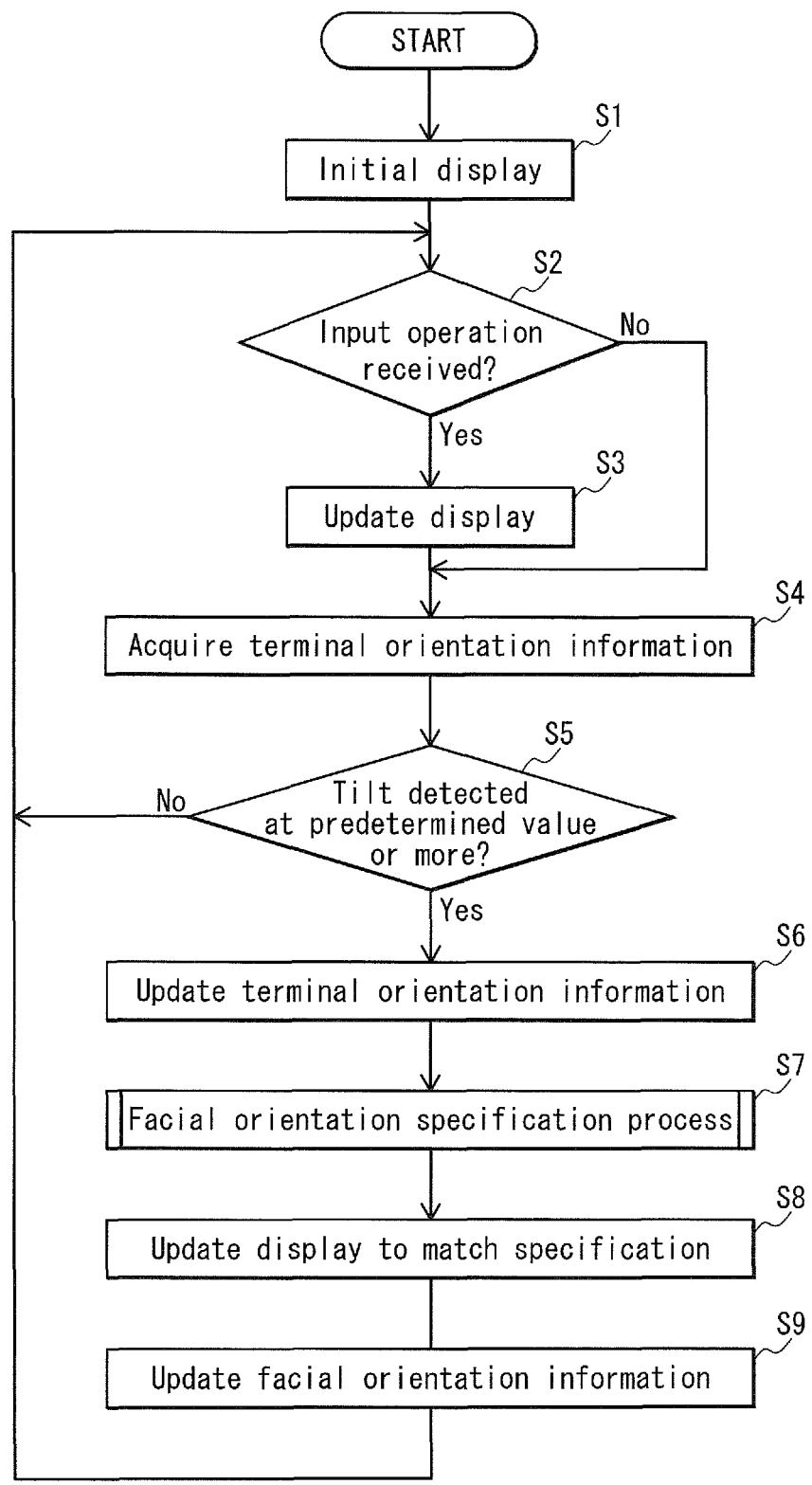
FIG. 5 is a flowchart of the operations of the display device 100.

FIG. 5 is a flowchart of the operations of the display device 100.

As shown, once the display device 100 is activated, the terminal orientation determiner 110 first displays a background images, icons, and so on, in accordance with a predetermined initial display used after start-up (step S1). Afterward, when an input operation is received from the user (Yes in step S2), processing corresponding to the input operation is performed, and the display is updated (step S3). For example, when the user inputs a text string by touching the touch panel 101, the text string is displayed. Next, the terminal orientation determiner 110 acquires the terminal orientation information 10 from the memory 160 (step S4) and uses the tilt indicated in the terminal orientation information 10 to determine whether or not the tilt currently detected by the tilt detector 111 has changed by the predetermined value or more (step S5). The terminal orientation determiner 110 makes the determination by first subtracting the tilt detected by the tilt detector 111 from the terminal orientation information 10 stored in the memory 160 and then taking the absolute value P of the result. The resulting absolute value P is then compared to a value obtained by subtracting P from 360, and a change in tilt S is defined as the smaller of the two values.

The absolute value P is expressed as follows, where the tilt indicated by the terminal orientation information 10 is f(n) and the tilt currently detected by the tilt detector 111 is m.

$$P = |f(n) - m| \quad \text{(Math. 2)}$$

Also, the change in tilt S is expressed as follows, where a Min function is defined as shown.

$$\text{Min}(a, b) = a (a \leq b) \quad \text{(Math. 3)}$$
$$= b (a > b)$$
$$S = \text{Min}(P, 360 - P) \quad \text{(Math. 4)}$$

The terminal orientation determiner 110 then determines whether or not the change in tilt S is greater than the predetermined value.

According to the above, the display orientation of the display objects is updated from A-facing to C-facing when, for example, the calculation of the terminal orientation information 10 and the change in tilt S reveal that the tilt has changed from 0° to 135°. Once the terminal orientation information 10 has been updated to read 180°, the terminal orientation determiner 110 determines that the tilt has not changed by more than the predetermined value despite the tilt of the display device 100 approaching 135° and being unstable, because the change in tilt is less than the difference between the predetermined value and the 180 indicated in the terminal orientation information 10, that is, less than 70°. As a result, frequent instances of the power draining processes, performed by the facial orientation specifier 120, of capturing the facial image of the user and performing facial recognition are avoidable.

When the terminal orientation determiner 110 determines that the tilt has changed by the predetermined value or more (Yes in step S5), the controller 130 updates the terminal orientation information 10 stored in the memory 160 (step S6), and makes a notification to the facial orientation specifier 120 indicating that the terminal orientation determiner 110 has made the affirmative determination. Upon receiving the notification, the facial orientation specifier 120 performs the facial orientation specification process (step S7). The details of the facial orientation specification process are given later.

The controller 130 rotates the display object in accordance with the upright facial orientation specified in the facial orientation specification process, shrinks or magnifies the display object as appropriate for the touch panel 101, and transmits an instruction to the display unit 140. Upon receiving the instruction, the display unit 140 displays the display object on the touch panel 101 (step S8). When the facial orientation specifier 120 fails to specify the facial orientation, the facial orientation is made to match the vertical orientation of the display device 100, such that the display object faces upward with the top edge of the display device 100 being defined as upward.

Then, the controller 130 updates the facial orientation information 20 with the display orientation of the display object as updated in step S8 (step S9).

Figure 6:
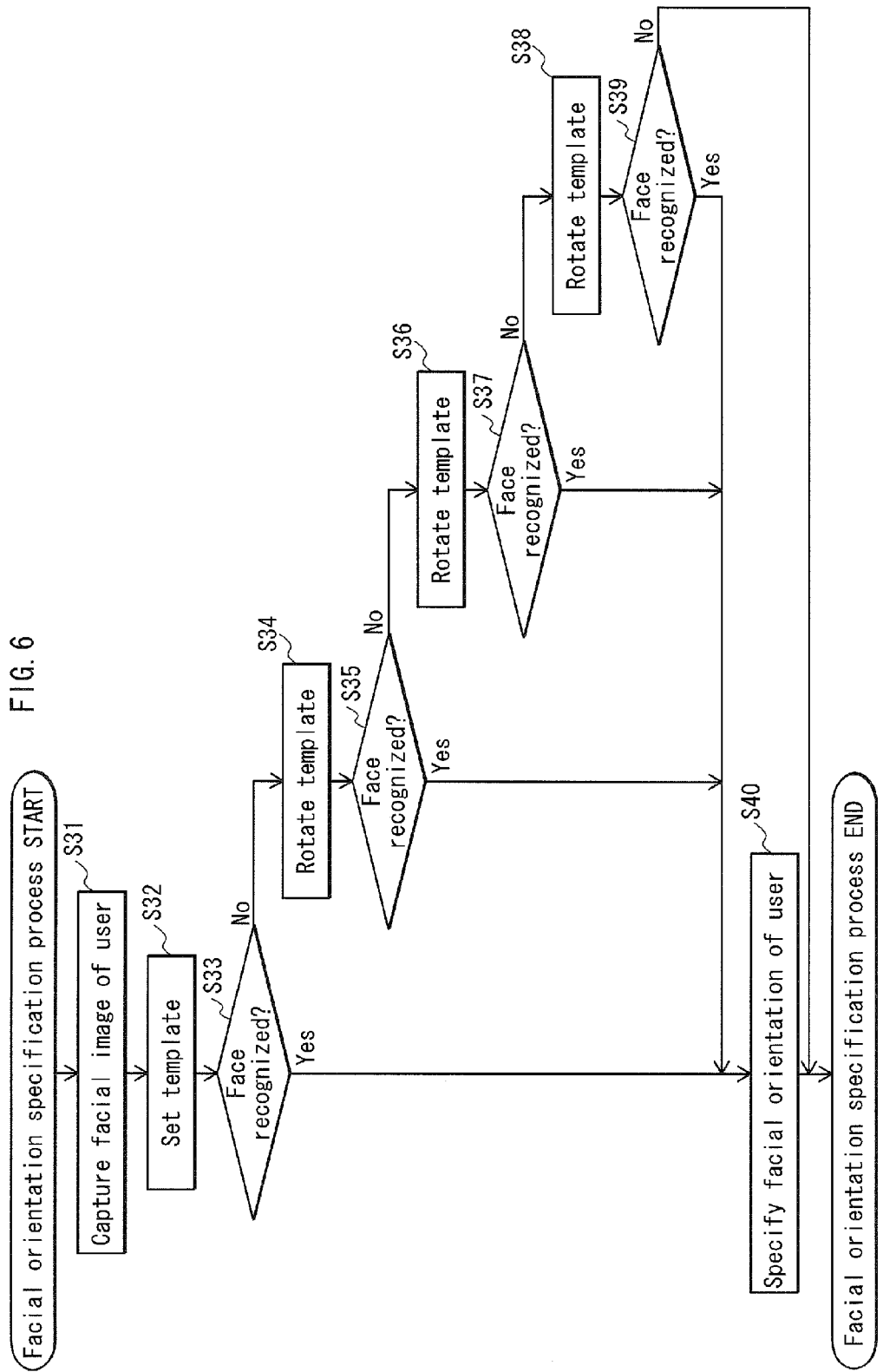
FIG. 6 is a flowchart of the details of a facial orientation specification process.

The following describes the details of the facial orientation specification process of step S7, with reference to FIG. 6.

First, the facial orientation specifier 120 activates the camera 102 and captures a facial image of the user (step S31). Next, sequential face recognition is performed by rotating the template to be A-facing, B-facing, C-facing, and D-facing, until the eyes and nose are recognized in the captured facial image. The template is set to face upward, oriented as indicated by the facial orientation information 20, i.e., such that the top of the display object faces the top prior to the affirmative determination by the terminal orientation determiner 110 (step S32), and face recognition is performed (step S33). When the nose and eyes cannot be detected (No in step S33), the edge of the display device 100 currently serving as the top edge is detected using the tilt in the terminal orientation information 10, the template is rotated to match the detected top edge, i.e., so as to be oriented toward the current top edge of the display device 100 (step S34), and face recognition is performed (step S35).

When the eyes and nose still cannot be detected, the template is rotated sequentially into the remaining two orientations, until face recognition succeeds (steps S36 and S38), then face recognition is performed (steps S37 and S39).

In step S34, when there is no match between the orientation in which the current top edge of the display device 100 and the orientation in which the display object faces upward, prior to the determination by the terminal orientation determiner 110 that the tilt has changed by the predetermined value or more, the template is rotated sequentially into the remaining three orientations until face recognition succeeds (steps S34, S36, and S38), then face recognition is performed (steps S35, S37, S39).

When the face recognition unit 122 succeeds at face recognition (Yes in one of step S33, S35, S37, and S39), the facial orientation specifier 120 specifies the vertical orientation of the template in which the eyes and nose are detected as being the upright orientation of the user's face (step S40), and notifies the controller 130 accordingly. When the face recognition unit 122 fails to recognize the face (No in step S39), the controller 130 is notified that recognition has failed.

The following describes specific operations of the display device 100 with reference to FIGS. 2A through 2D, 4A, and 4B-1 through 4B-4.

Figure 4A:
Figure 4B:
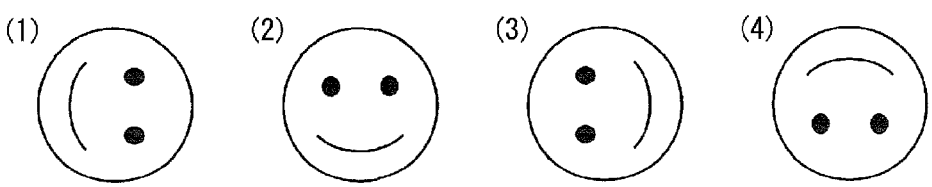

In this example, the user first uses the display device 100 as shown in FIG. 2B, such that edge 202 is the top edge. The user then rotates the display device 100 such that edge 201 is the top edge (see FIG. 2A). Further, a situation in which the user then lies down while using the display device 100 (see FIG. 2D) is described. FIGS. 4A and 4B-1 through 4B-4 illustrate the face specification process. FIG. 4A represents the captured facial image of the user, while FIGS. 4B-1 through 4B-4 represent the template.

First, when the usage condition changes from that of FIG. 2B to that of FIG. 2A, the tilt detector 111 detects a tilt of 3°. At this time, the terminal orientation information 10 indicates 90°, and thus, the following calculation occurs.

$$P=|90-3|=87$$

Change in tilt S=Min(87,273)=87≥70

Accordingly, the terminal orientation determiner 110 determines that the tilt has changed by more than the predetermined value. The terminal orientation determiner 110 notifies the controller 130 of the determination results. Upon receiving the notification, the controller 130 updates the terminal orientation information 10 to 0°, and notifies the facial orientation specifier 120 that the terminal orientation determiner 110 has detected a change in tilt greater than the predetermined value. Upon receiving the notification, the facial orientation specifier 120 captures a facial image of the user. The facial image of the user is A-facing, as shown in FIG. 4A. As shown in FIGS. 4B-1 through 4B-4, the facial orientation specifier 120 rotates the template until the eyes and nose are recognized in the captured facial image, beginning with the B-facing orientation indicated in the facial orientation information 20, followed by the A-facing orientation in which the current upright edge of the display device 100 according to the terminal orientation information 10 is upward, in turn sequentially followed by the D-facing and C-facing orientations. That is, the template is first rotated such that the top thereof is B-facing, as indicated in the facial orientation information 20, and face recognition is then performed (See FIG. 4B-1). Here, the eyes and nose are not recognized because the upright orientation of the user's face and the vertical orientation of the template differ too greatly. Next, the facial orientation specifier 120 rotates the template such that the top thereof is A-facing, and face recognition is then performed (See FIG. 4B-2). Here, the eyes and nose are recognized in the captured image, and the facial orientation specifier 120 specifies the facial orientation as being A-facing. The facial orientation specifier 120 notifies the controller 130 of the specified orientation. Upon receiving the notification, the controller 130 rotates the display object so as to be A-facing as specified by the facial orientation specifier 120, shrinks or magnifies the display object to fit a display range of the touch panel 101, and transmits an instruction to the display unit 140. Upon receiving the instruction, the display unit 140 makes the display on the touch panel 101. The controller 130 also updates the facial orientation information 20 to indicate the A-facing orientation.

Next, when the usage condition changes from that of FIG. 2A to that of FIG. 2AD the tilt detector 111 detects a tilt of 92° and the following occurs.

$$P=|0-92|=92$$

Change in tilt S=Min(92,268)=92≥70

The terminal orientation determiner 110 determines that the tilt has changed by more than the predetermined value. Subsequently, the controller 130 updates the terminal orientation information 10 to 90°, and notifies the facial orientation specifier 120 to the effect that the terminal orientation determiner 110 has made the affirmative determination. Upon receiving the notification, the facial orientation specifier 120 captures a facial image of the user, rotates the template to the A-facing orientation indicated by the facial orientation information 20, and performs face recognition. At this time, the captured image of the user's face is A-facing relative to the display device 100. Thus, the face is recognized and the facial orientation specifier 120 specifies the facial orientation as being A-facing. The controller 130 rotates the display object so as to be A-facing as specified by the facial orientation specifier 120, shrinks or magnifies the display object to fit a display range of the touch panel 101, and transmits an instruction to the display unit 140. Upon receiving the instruction, the display unit 140 makes the display on the touch panel 101.

(Supplement)

Although the present disclosure is described above using the Embodiment of the display device as an example, no limitation is intended. The following variations are of course possible.

(1) In the above-described Embodiment, the terminal orientation determiner makes a determination regarding whether or not a change in tilt of a predetermined value or more has occurred, and the predetermined value is 70° from a pre-change reference value. However, no limitation is intended. When the tilt is unstable and approaches the limit of determination, avoiding frequent instances of the face recognition process is beneficial. Thus, the predetermined value may be such that the determination is made only when the orientation of the display device changes due to user operation by a given amount or more. For example, the reference value and the predetermined value may be unset, and an affirmative determination may be made when the angle range that includes the angle detected by the tilt detector changes to a different angle range. Also, the terminal orientation determiner is not limited to four possible reference values corresponding to four orientations to which display is expected to switch, namely 0°, 90°, 180°, and 270°. Eight reference values or other configurations are also possible. When four orientations are used, the predetermined value is beneficially greater than 50°.

(2) In the above-described Embodiment, face recognition involves rotating the template through four orientations, and one of the four orientations is specified as upward. However, no limitation is intended. Provided that the upright orientation of the face is specifiable for display orientation determination purposes, then for example, the template may be rotated by 5° within ranges such as 70°-100°, 160°-200°, 250°-290°, and 340°-20°. The vertical orientation determined through face recognition is not limited to four possible orientations.

Also, in the above-described Embodiment, when the face recognition unit fails to recognize the face, the controller displays the display object such that the upright orientation of the face and the upward orientation of the display device match. However, no limitation is intended. Provided that the display object is displayed despite the absence of face orientation specification, the facial orientation specifier may specify the upright orientation of the display device as the vertical orientation of the face when the face recognition unit fails to recognize the face.

(3) In the above-described Embodiment, face recognition is first performed by rotating the template such that there is a match between the upward orientations of the template and of the display object prior to the change in tilt. Subsequently, face recognition is performed by rotating the template such that there is a match between the current upward orientation of the display device and the vertical orientation of the template. However, no limitation is intended. Provided that the template is rotated sequentially and face recognition is performed effectively, then for example, face recognition may first be performed by rotating the template such that there is a match between the current upward orientation of the display device and the vertical orientation of the template. Also, when the template has been rotated through three orientations, excluding the template orientation matching the current vertical orientation of the display device, without successful face recognition, the display object may be displayed according to the display orientation that matches the current orientation of the display device without performing facial recognition to such effect. Accordingly, the face recognition process is restricted to a maximum of three iterations.

(4) In the above-described Embodiment, a template is used for face recognition. However, no limitation is intended, provided that parts of a face are recognizable. For example, digitized values may be used for reference instead of the template, and face recognition may be performed using digitized values for the position, shape, and so on of facial elements.

(5) In the above-described Embodiment, the facial orientation specifier specifies the upright orientation of the face by recognizing the eyes and nose of a captured facial image. However, no limitation is intended. Provided that the upright orientation of the face is specified, other features such as the eyes and eyebrows, the shoulders, the neck, and so on may also be used.

(6) In the above-described Embodiment, the tilt detector is described as being an acceleration sensor. However, no limitation is intended, provided that the angle of tilt is detected or that an angle can be computed from a value detected by a gyro-sensor or the like.

(7) In the above-described Embodiment, the terminal orientation determiner determines the tilt according to the angle between the x-y component of the pull of gravity on the touch panel 101 and the y-axis. However, no limitation is intended. The tilt may also be determined according to the angle between the y-z component of the pull of gravity and the y-axis component, assuming a situation where the display device is handed to another user and rotated about the x-axis. The facial orientation specification need only occur upon the change in orientation of the display device lasting more than a predetermined interval after user operation.

(8) In the above-described Embodiment, the facial orientation specifier captures the facial image of the user and performs face recognition only when the terminal orientation determiner has determined that a change in tilt by more than the predetermined value has occurred. Provided that the display device processor is in a low-power state when not performing a process, further power consumption reduction is also possible.

(9) The above-described Embodiments and variations may be partially combined.

The following describes a further Embodiment of the present disclosure in terms of the display device configuration and the effects thereof.

(a) In one aspect, as shown in FIG. 3, a portable display device has a display, operable to switch a display orientation of a display object on the display among a plurality of available display orientations, the display device comprising: a tilt detection unit detecting an angle of rotation as being a display tilt, the angle being measured between a vertical plane component of a tilt vector of a predetermined reference line in the display and a gravitational vector; a facial orientation specification unit recognizing a face of a person facing the display and specifying an upright orientation of the face relative to a current position of the display; a terminal orientation determination unit establishing a plurality of angle ranges within each of which the display orientation remains unchanged depending on the available display orientations, and determining whether or not the display tilt newly detected by the tilt detection unit exceeds a given angle range and enters another angle range among the established angle ranges, the given angle range including the angle detected by the tilt detection unit upon updating a previous display orientation; and a control unit causing the facial orientation specification unit to begin the specification when the terminal orientation determination unit makes an affirmative determination, and updating the display orientation according to the upright orientation of the face specified for display. The number angle ranges depend on the number of available display orientations. However, the number of available display orientations and the number of angle ranges need not necessarily match. For example, eight angle ranges may be used for four display orientations. Also, provided that an angle is calculated from information detected thereby, the tilt detection unit need not necessarily detect an angle. According to this configuration, the display device does not constantly perform the processes involved in specifying the upright orientation of the face. These processes are performed only when the tilt detection unit detects a change in tilt such that the tilt is included in a different angle range. Thus, the display object is displayed with a display orientation matching the upright orientation of the user's face, while electric power consumption is constrained.

(b) Also, the terminal orientation determination unit makes the affirmative determination when the display tilt newly detected by the tilt detection unit exceeds the given angle range that includes the angle detected by the tilt detection unit upon updating the previous display orientation, and the display tilt enters the other angle range upon exceeding a limit of the given angle range by at least a predetermined amount. According to this configuration, the affirmative determination is made when the display tilt detected by the tilt detection unit exceeds the angle range that includes the tilt detected upon updating the previous display orientation, and enters the other angle range by exceeding a limit of the angle range by at least a predetermined amount. Thus, a situation where electric power is continually consumed by the facial image capture and face recognition process is avoided, despite an unstable display device tilt approaching the limit of a given angle range.

(c) Further, the terminal orientation determination unit makes the determination based on the angle detected by the tilt detection unit between the vertical plane component of the tilt vector and the reference line, with respect to a display plane. According to this configuration, the terminal orientation determination unit performs the determination based only on an angle of the tilt indicating the vertical orientation component with respect to a display plane. Thus, in a usage case where the display plane is raised from the horizontal, the display object is displayed with an appropriate orientation corresponding to the user rotating the display as needed. Also, the determination is effective because the tilt is detectable with respect to all directions, enabling better reduction of electric power consumption.

(d) In addition, the display device further comprises a memory unit storing therein the previous display orientation of the display object on the display, wherein the facial orientation specification unit includes a face recognition unit recognizing facial elements in a captured facial image by referencing a facial element recognition template stored in advance and having a designated orientation, and the face recognition unit references the template by initially designating an upward orientation of the display object according to the display orientation stored in the memory unit as an upward orientation of the template. According to this configuration, the number of face recognition iterations is reduced to cases where the user lies down with the display device and the like, thus further reducing the electric power consumed by the face recognition process.

(e) Further still, when the face recognition unit fails to recognize the facial elements, the facial orientation specification unit detects a current top edge of the display from the angle detected by the tilt detection unit, and specifies the upright orientation of the face such that the detected edge is oriented upward. According to this configuration, the vertical orientation of the display device is specified as the upright facial orientation when the face recognition unit fails to recognize the facial elements. Thus, the display object is displayed despite the face recognition unit failing to perform face recognition.

(f) In addition, the tilt detection unit is an acceleration sensor. According to this configuration, the tilt detection unit is an acceleration sensor and is able to measure tilt in three dimensions, corresponding to the x-axis, the y-axis, and the z-axis.

(g) In further addition, the display has four available display orientations, and the angle ranges depending on the selected number each include 90°. According to this configuration, the angle range is set to match the quantity of display orientations. Thus, the determination and change in display orientation are highly likely to be performed efficiently.

Further, the facial orientation specification unit includes a face recognition unit recognizing facial elements in a captured facial image by referencing a facial element recognition template stored in advance and having a designated orientation, and the face recognition unit detects a current top edge of the display from the angle detected by the tilt detection unit, initially designates the detected edge as the upward orientation of the template, and then references the template. According to this configuration, the number of face recognition iterations is reduced to cases where the user changes the tilt of the display device and the like.

The display device pertaining to the present disclosure constrains electric power consumption while displaying a display object in an orientation corresponding to the upright orientation of a user's face relative to the display. Thus, the display device is applicable to display orientation switching functionality and similar.

REFERENCE SIGNS LIST

100 Display device
101 Touch panel
102 Camera
103 Speaker
110 Terminal orientation determiner
111 Tilt detector
120 Facial orientation specifier
121 Capture unit
122 Face recognition unit
130 Controller
140 Display unit
150 Input unit
160 Memory

The invention claimed is:

1. A portable display device having a display configured to display an object, the display device comprising:
a non-transitory memory storing a program and direction information that indicates a direction of the display device immediately prior to a change in direction of the display device; and
a hardware processor configured to execute the program and cause the display device to operate as:
a detection unit detecting a tilt angle of a plane of the display relative to a gravitational vector;
a specification unit specifying a facing of a head of a user, relative to the display device, by using a facial image obtained by capturing an image of a face of the user when facing the display;
a determination unit calculating a difference between a tilt angle newly detected by the detection unit and the direction information, and determining whether or not the direction of the display device changes, based on a determination of whether or not the difference calculated is greater than or equal to a predefined threshold; and a control unit that, when the determination unit determines that the difference is greater than or equal to the predefined threshold, causes the specification unit to execute the specifying of the facing of the head of the user, causes the object to be rotated so that the facing of the head of the user matches the facing specified, and causes the rotated object to be displayed on the display, wherein the direction information is an angle that is representative of an angle range that includes a tilt angle detected by the detection unit immediately prior to a change in direction of the display device, among a plurality of angle ranges, when the specification unit is unable to recognize a user's face, an upright orientation of the portable display device is specified as the vertical orientation of the face, and when the determination unit determines that the difference is less than the predefined threshold, frequent instances of the power draining processes, performed by the specification unit, of capturing the facial image of the user are avoided.

2. The display device of claim 1, wherein
the determination unit determines that the direction of the display unit changes when the tilt angle newly detected by the detection unit exceeds the angle range that includes the tilt angle detected by the detection unit immediately prior to change in direction of the display device, and the tilt angle enters another angle range upon exceeding a limit of the angle range that includes the tilt angle by at least a predefined amount.

3. The display device of claim 2, wherein
the detection unit detects a tilt angle between a component of the gravitational vector in the plane of the display and a reference line in the plane of the display.

4. The display device of claim 3, wherein
the non-transitory memory further stores a previous display orientation of the object on the display,
the specification unit includes a face recognition unit recognizing facial elements in a captured facial image by referencing a facial element recognition template stored in advance and having a designated orientation, and
the face recognition unit references the template by initially designating an upward orientation of the object according to the display orientation stored in the memory unit as an upward orientation of the template.

5. The display device of claim 4, wherein
when the face recognition unit fails to recognize the facial elements, the specification unit detects a current top edge of the display from the tilt angle detected by the detection unit, and specifies the upright orientation of the face such that the detected edge is oriented upward.

6. The display device of claim 5, wherein
the display has four available display orientations, and the angle ranges depending on the selected number each include 90°.

7. The display device of claim 4, wherein
the face recognition unit does not perform processing to recognize facial elements in the captured facial image when the determination unit determines that the difference is less than the predefined value.

8. The display device of claim 3, wherein
the specification unit includes a face recognition unit recognizing facial elements in a captured facial image by referencing a facial element recognition template stored in advance and having a designated orientation, and
the face recognition unit detects a current top edge of the display from the tilt angle detected by the detection unit, initially designates the detected edge as the upward orientation of the template, and then references the template.

9. The display device of claim 1, wherein
the determination unit determines that the tilt angle detected by the detection unit does not enter another angle range when changes to the tilt angle are detected near a limit of the angle range that includes the tilt angle.

10. The display device of claim 1, wherein
the determination unit determines that the tilt angle detected by the detection unit does not enter another angle range when changes to the tilt angle are detected near a limit of the angle range that includes the tilt angle that do not exceed a predefined value from a midpoint value of the angle range.

11. The display device of claim 1, wherein
the angle that is representative of the angle range is a midpoint value of the angle range.

12. The display device of claim 1, wherein
the plurality of angle ranges comprises an angle range from 315° to 45°, an angle range from 45° to 135°, an angle range from 135° to 225°, and an angle range from 225° to 315°.

13. A display orientation switch method for a portable display device having a display configured to display an object, the display orientation switch method, comprising:

a detection step of a detection unit detecting a tilt angle of a plane of the display relative to a gravitational vector;

a specification step of a specification unit specifying a facing of a head of a user, relative to the display device, by using a facial image obtained by capturing an image of a face of the user when facing the display;

a determination step of a determination unit calculating a difference between a tilt angle newly detected by the detection unit and the direction information, and determining whether or not the direction of the display device changes, based on a determination of whether or not the difference calculated is greater than or equal to a predefined threshold; and a control step of a control unit that when the determination step determines that the difference is greater than or equal to the predefined threshold, causes the specification unit to execute the specifying of the facing of the head of the user, causes the object to be rotated so that the facing of the head of the user matches the facing specified, and causes the rotated object to be displayed on the display, wherein the direction information is an angle that is representative of an angle range that includes a tilt angle detected by the detection unit immediately prior to a change in direction of the display device, among a plurality of angle ranges, when the specification step is unable to recognize a user's face, an upright orientation of the portable display device is specified as the vertical orientation of the face, and when the determination step determines that the difference is less than the predefined threshold, frequent instances of the power draining processes, performed by the specification unit, of capturing the facial image of the user are avoided.

* * * * *